United States Patent [19] [11] 4,334,889
Takabayashi [45] Jun. 15, 1982

[54] METHOD FOR IMPROVING COMBUSTIBILITY OF LIQUID FUEL

[76] Inventor: Toshiaki Takabayashi, 4-2, Kugayama 2-chome, Suginami-ku, Tokyo, Japan

[21] Appl. No.: 165,121

[22] PCT Filed: Dec. 22, 1978

[86] PCT No.: PCT/JP78/00063
§ 371 Date: Aug. 30, 1979
§ 102(e) Date: Aug. 30, 1979

[87] PCT Pub. No.: WO79/00487
PCT Pub. Date: Jul. 26, 1979

[30] Foreign Application Priority Data
Jan. 9, 1978 [JP] Japan ............... 53-525

[51] Int. Cl.$^3$ .................................. C10L 1/00
[52] U.S. Cl. ........................... 44/50; 44/52; 123/536; 123/538
[58] Field of Search .......... 44/50, 52; 123/536, 123/538

[56] References Cited
U.S. PATENT DOCUMENTS

| | | | |
|---|---|---|---|
| 1,432,178 | 10/1922 | Greenstreet | 44/51 |
| 1,800,997 | 4/1931 | Greenstreet | 44/57 |
| 2,077,406 | 4/1937 | Gaertner | 44/52 |
| 2,194,887 | 3/1940 | DeLamprecht | 44/52 |
| 3,110,294 | 11/1963 | Nyman | 123/536 |
| 3,116,726 | 1/1964 | Kwartz | 123/538 |
| 3,264,509 | 8/1966 | Moriya | 313/153 |
| 3,614,691 | 10/1971 | Miyata | 335/306 |

Primary Examiner—Winston A. Douglas
Assistant Examiner—Y. Harris Smith
Attorney, Agent, or Firm—Birch, Stewart, Kolasch & Birch

[57] ABSTRACT

A method of improving in the combustibility of gasoline by injecting oxygen gas into gasoline in the stationary or flowing state under a magnetic field. The gasoline treated by the method has an ability to prolong the running time of an internal combustion engine 3% to 4% longer under the same conditions than the untreated gasoline.

8 Claims, 3 Drawing Figures

METHOD FOR IMPROVING COMBUSTIBILITY OF LIQUID FUEL

TECHNICAL FIELD

The invention relates to a treatment for improvement in utilizing of liquid fuel and more particularly to a method for increasing combustibility of gasoline.

BACKGROUND ART

A patent application Ser. No. Sho 52-38075, Pub. No. Sho 53-123403 entitled "Method for improvement in liquid fuel", has been filed in Japan by the present inventor in which proposed a method for increasing the combustibility of gasoline by several percents is proposed, the method comprising keeping gasoline for several days under a magnetic field of a predetermined intensity. However, it is a problem that the proposed method requires too much time to be practicable.

DISCLOSURE OF THE INVENTION

The invention as claimed is intended to solve the above problem and provide a method capable of instantly improving the combustibility of gasoline.

Assuming that oxygen in air, because it is highly paramagnetic, gradually dissolves into gasoline disposed under a magnetic field to improve its combustibility, the inventor has derived a method including a step of directly injecting oxygen gas into gasoline under a magnetic field to obtain the same effect as in the previous one, and repeated the test of direct injection of oxygen gas into gasoline, resulting in reaching the present invention.

The method of the invention comprises the step of directly injecting oxygen-containing gas into liquid fuel under a magnetic field to instantly improve its combustibility. Gasoline rests or flows inside a receptacle surrounded by permanent magnets of at least 700 gauss, preferably more than 2000 gauss magnetic flux density and is treated in a manner that oxygen gas of less than 1 volume-ratio to the gasoline at atmospheric pressure is injected from an oxygen source in a high-pressure cylinder into the gasoline in the receptacle. When both the treated and untreated gasolines are supplied to an engine to run it under a similar condition, the treated one has an improved combustibility to activate the engine at least 3% to 4% longer than the untreated one. The magnet can be disposed inside the receptacle to produce a magnetic field. The combustibility was not improved when the oxygen gas was injected into gasoline without the magnetic field. The gasoline, once treated for injection of oxygen gas under the magnetic field, sustains its improved combustibility for a long time, irrespective of being preserved with or without magnets after the treatment.

In comparison with the previous method requiring much time for treatment of gasoline, the inventive method is capable of instantly improving the combustibility of gasoline and has such advantages that gasoline is unnecessary to be preserved for treatment and that gasoline flowing in a pipe-line can easily be treated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

THE BEST MODE FOR CARRYING OUT THE INVENTION

The method of the invention will now be explained in connection with the examples hereinbelow.

EXAMPLE 1

Figure 1:
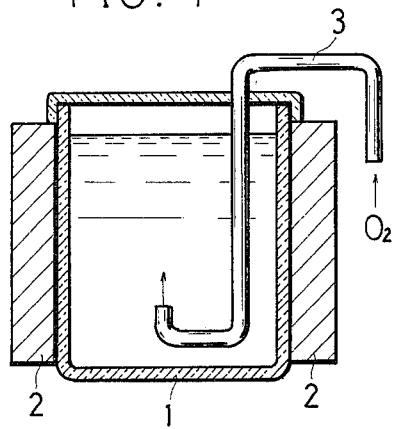
FIG. 1 is a schematic representation of an experimental device for testing the method of the invention.

As is seen in FIG. 1, ferrite magnets 2 of about 1,000 gauss magnetic flux density are attached to both outside surfaces of a square-built glass vessel 1. A pipe 3 extends from a non-illustrated high-pressure oxygen source to the inner bottom of the vessel 1. After the vessel 1 has been filled with gasoline on the market, oxygen gas is directly injected into the gasoline through the pipe 3 for 5 to 10 seconds, thus gasoline treated under a magnetic field is obtained. Thereafter, the magnets 2 are removed from the vessel 1 and the oxygen gas is injected to fresh gasoline for 10 seconds, then gasoline treated in the absence of the magnetic field is obtained.

Figure 2:
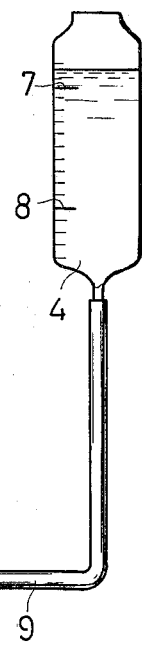
FIG. 2 is a schematic view illustrating the way of fuel-supply to the test engine.

Each of both the treated and an untreated gasolines was supplied to a gasoline engine (HONDA EM 300) for measurement of the running time of the engine to consume a certain amount of the respective gasolines. On every running test the engine was arranged to have a certain initial cylinder temperature and a predetermined load. As is seen in FIG. 2, the gasoline was directly supplied to the carburetor 6 of the engine 5 from a cylindrical funnel 4 through a pipe 9. The running times of the engine were measured; one time in which all the supplied gasoline of 50 cc was consumed and the other in which the gasoline between upper and lower marks 7, 8 in the cylindrical funnel 4 was spent. The volume between the marks 7, 8 in the funnel 4 was arranged to be 30 cc. The start-to-stop time for consumption of 50 cc gasoline and the time for consumption of 30 cc gasoline were measured and the results are shown in TABLE 1.

TABLE 1

| Condition of Gasoline | Running Time (second) upper: 30cc, lower: 50cc | | | | |
|---|---|---|---|---|---|
| | 1 | 2 | 3 | 4 | average |
| untreated | 303 | 299 | 300 | 302 | 301 |
| | 552 | 550 | 554 | 555 | 553 |
| treated with magnet injection 10 seconds | 310 | 312 | 312 | — | 311 |
| | 572 | 571 | 568 | — | 570 |
| treated with magnet injection 5 seconds | 312 | 313 | — | — | 313 |
| | 567 | 573 | — | — | 570 |
| treated without magnet injection 10 seconds | 300 | 302 | 305 | — | 302 |
| | 550 | 550 | 555 | — | 552 |

TABLE 1 shows that the gasoline treated by the inventive method can prolong the running time of the engine by 3% to 4% as compared with the untreated gasoline and that neither gasoline treated in the absence of the magnet nor untreated gasoline has the ability to increase the running time of the engine. It is noted that both treated gasolines with and without magnet were preserved in vessels without magnets for 24 hours prior to the above test.

EXAMPLE 2

Oxygen gas was injected for five minutes into gasoline with magnets in the same way as in Example 1 to obtain treated gasoline with magnet. The treated gasoline was preserved for six days in two vessels; one with magnets and the other without magnets. Every two days, engine tests were carried out in the same conditions as in Example 1 for measurement of the running time of the engine to consume 20 cc of gasoline. The distance between the marks 7, 8 was arranged to be equivalent to the volume of 20 cc. The untreated gasoline was tested twice before and after the test of treated gasoline. The test results are shown in TABLE 2.

TABLE 2

| Condition of Gasoline | Running Time (second) | | | | |
|---|---|---|---|---|---|
| | 1 | 2 | 3 | 4 | average |
| two days preservation | | | | | |
| untreated, first | 188 | 189 | 187 | 188 | 188 |
| untreated, second | 187 | 189 | — | — | 188 |
| with magnet | 199 | 196 | 196 | — | 197(4.8% up) |
| without magnet | 193 | 198 | 197 | — | 196(4.3% up) |
| four days preservation | | | | | |
| untreated, first | 184 | 188 | 183 | — | 185 |
| untreated, second | 185 | 185 | — | — | 185 |
| with magnet | 197 | 191 | 192 | — | 193(4.3% up) |
| without magnet | 199 | 197 | 193 | — | 196(5.9% up) |
| six days preservation | | | | | |
| untreated, first | 183 | 185 | 187 | — | 185 |
| untreated, second | 185 | 184 | — | — | 185 |
| with magnet | 195 | 192 | 192 | — | 193(4.3% up) |
| without magnet | 190 | 192 | 194 | — | 192(3.6% up) |

It is understood from the above TABLE that the gasoline subjected to the injection of oxygen gas under the magnetic field sustains the improved combustibility for a long time, irrespective of being preserved with or without magnet. This is attributed to the fact that the gasoline treated with the magnet has oxygen stably dissolved therein, therefore it requiring no magnet to maintain such oxygen.

EXAMPLE 3

A square-built vessel of 0.5 liter was surrounded by ferrite magnets so as to have at the inner surface thereof a magnetic flux density of 2000 gauss. Oxygen gas of 0.5 liter and 1.0 liter per minute was injected into the gasoline in the vessel for 5 minutes with the intervention of a regulator valve from an oxygen source in a high pressure cylinder. The volume ratios of injected oxygen to the gasoline were 8.3% and 16.7% at atmospheric pressure, respectively. The treated and untreated gasolines were tested in the same way as in Example 1. The distance between the marks 7, 8 in the funnel cylinder was arranged to correspond to 20 cc, and the running time of the engine to consume 20 cc of the respective gasolines was measured. The results are shown in TABLE 3.

TABLE 3

| Condition of Gasoline | Running Time of Engine (second) | | | |
|---|---|---|---|---|
| | 1 | 2 | 3 | average |
| untreated, first | 187 | 193 | 190 | 190 |

TABLE 3-continued

| Condition of Gasoline | Running Time of Engine (second) | | | |
|---|---|---|---|---|
| | 1 | 2 | 3 | average |
| treated, oxygen 0.5 lit./min. | 200 | 202 | 200 | 201(5.8% up) |
| treated, oxygen 1.0 lit./min. | 198 | 197 | 200 | 200(4.2% up) |
| untreated, second | 189 | 189 | 193 | 190 |

EXAMPLE 4

Two 0.5 liter vessels of 4 cm inner width were surrounded by magnets so as to have at their inner surface the respective magnetic flux densities of 1500 gauss and 700 gauss. Oxygen gas of 8%, by volume to gasoline, was injected into the gasoline in each vessel. The treated gasolines were tested in the same way as in Example 1. The average increases in the running time of the engine were 4.5% and 4% in the respective cases of the gasoline treated under 1500 gauss and 700 gauss.

EXAMPLE 5

Figure 3:
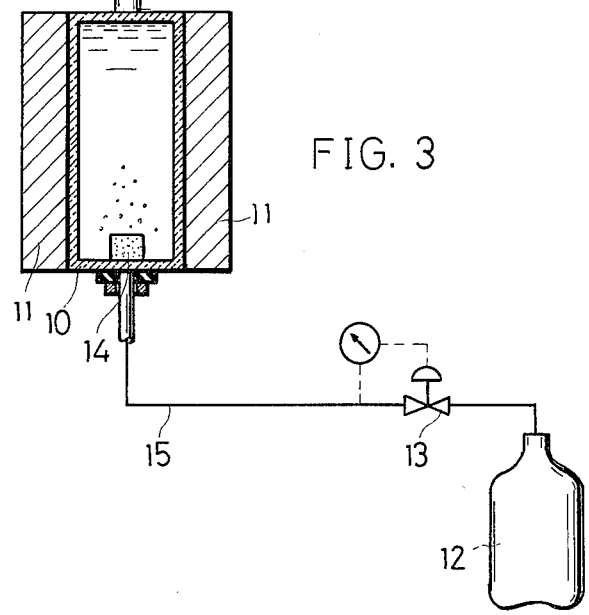
FIG. 3 is a representation, similar to FIG. 1, of another experimental device.

As is seen in FIG. 3, a closed passage 10 made of synthetic plastics having a width of 2 cm and a pair of ferrite magnets 11 of about 2500 gauss being attached to the both sides is illustrated. A pipe 15 extends from a high pressure oxygen cylinder 12 to a porous block 14 disposed on the bottom of the passage 10 through a regulator valve 13. Gasoline of 0.5 liter per minute flows in and out of the passage 10 through ports as shown by arrows.

Oxygen gas of about 0.5 liter per minute was injected into the gasoline in the passage 10 from the cylinder 12 to obtain gasoline treated with magnet. Thereafter, the magnets were removed to obtain the gasoline treated without magnet. Both the treated gasoline and untreated gasoline were tested on the same engine as in Example 1. In the test, the engine started at the initial cylinder temperature of 31° C. and idled without load. The running times of the engine to consume 50 cc and 25 cc of the respective gasolines were measured, the distance between the upper and lower marks in the funnel being arranged to be equivalent to the volume of 25 cc. The test results are shown in due order in TABLE 4.

TABLE 4

| Order | Condition of Gasoline | Running Time of Engine (second) | |
|---|---|---|---|
| | | 25cc | 50cc |
| 1 | treated without magnet | 255 | 495 |
| 2 | untreated | 253 | 489 |
| 3 | treated without magnet | 260 | 499 |
| 4 | untreated | 257 | 490 |
| 5 | treated without magnet | 255 | 493 |
| 6 | untreated | 260 | 501 |
| 7 | treated without magnet | 253 | 488 |
| 8 | untreated | 258 | 496 |
| 9 | treated with magnet | 270 | 510 |
| 10 | untreated | 254 | 491 |
| 11 | treated with magnet | 267 | 504 |
| 12 | untreated | 255 | 489 |
| 13 | treated with magnet | 280 | 510 |
| 14 | untreated | 252 | 484 |
| 15 | treated with magnet | 277 | 518 |
| 16 | untreated | 258 | 498 |
| average, treated with magnet | | 274 | 511 |
| increase over untreated (%) | | 7.0 | 3.9 |
| average, treated without magnet | | 256 | 494 |
| increase over untreated (%) | | 0 | 0.4 |
| average, untreated | | 256 | 492 |

TABLE 4 shows that gasoline, even while flowing, improves its combustibility in the case of being subjected to the injection of oxygen gas under a magnetic field, but not in the case of being treated without the magnetic field.

EXPLOITATION IN INDUSTRY

The gasoline treated by the method of the invention prolongs the running time of engine 3% to 4% longer than the untreated one, therefore being capable of economizing the consumption of gasoline to that extent. The cost of oxygen gas indispensable to the method is remarkably low as compared to the reduction of fuel cost. Accordingly, the inventive method is practicable wherever gasoline and engines are used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method for improving the combustibility of liquid hydrocarbon fuel inclusive of gasoline comprising the step of injecting oxygen gas from a high pressure source of oxygen into the liquid hydrocarbon fuel contained in a vessel outwardly surrounded by permanent magnets of at least 700 gauss magnetic flux density.

2. A method as claimed in claim 1, wherein the oxygen gas of 7% to 100%, by volume-ratio to the gasoline at atmospheric pressure, is injected into the gasoline in the vessel.

3. A method as claimed in claim 2, wherein the oxygen gas is injected into the gasoline flowing through the vessel.

4. A method for improving the combustibility of liquid hydrocarbon fuel inclusive of gasoline comprising the following steps:
    positioning said liquid hydrocarbon fuel in a container outwardly surrounded by magnets having a magnetic flux density of at least 700 gauss;
    injecting substantially pure oxygen gas into said container; and
    continuing the injection of said substantially pure oxygen gas for a period of at least five seconds.

5. A method for improving the combustibility of liquid hydrocarbon fuel according to claim 4 and further including the step of storing the liquid hydrocarbon fuel in said container under said magnetic flux density of at least 700 gauss for a predetermined period of time.

6. A method for improving the combustibility of liquid hydrocarbon fuel inclusive of gasoline comprising the following steps:
    supplying said liquid hydrocarbon fuel thru a conduit;
    subject a portion of said conduit to a magnetic field having a magnetic flux density of at least 700 gauss;
    injecting substantially pure oxygen gas into said liquid hydrocarbon fuel in an area adjacent said portion of said conduit subjected to the influence of said magnetic field; and
    continuing the injection of said substantially pure oxygen gas for a predetermined time period.

7. A method for improving the combustibility of liquid hydrocarbon fuel inclusive of gasoline comprising the following steps:
    supplying said liquid hydrocarbon fuel to a chamber disposed within a fuel supply line;
    subjecting said chamber to a magnetic field having a flux density of at least 700 gauss;
    injecting substantially pure oxygen gas into said liquid hydrocarbon fuel disposed within said chamber subjected to the influence of said magnetic field;
    continuing the injection of said substantially pure oxygen gas so as to achieve a volume ratio of injected oxygen gas to liquid hydrocarbon fuel of at least 8.3% at atmospheric pressure.

8. A method for improving the combustibility of liquid hydrocarbon fuel according to claim 4, 6 or 7, wherein said magnetic field is produced by permanent magnets.

* * * * *